US012669634B2

(12) United States Patent (10) Patent No.: US 12,669,634 B2
Yamagishi (45) Date of Patent: Jun. 30, 2026

(54) METHOD FOR MANUFACTURING OPTICAL COMPUTATION DEVICE, OPTICAL DIFFRACTION UNIT INTERMEDIATE, AND OPTICAL COMPUTATION DEVICE

(71) Applicant: Fujikura Ltd., Tokyo (JP)

(72) Inventor: Hiroyuki Yamagishi, Chiba (JP)

(73) Assignee: Fujikura Ltd., Tokyo (JP)

( * ) Notice: Subject to any disclaimer, the term of this patent is extended or adjusted under 35 U.S.C. 154(b) by 402 days.

(21) Appl. No.: 18/039,194

(22) PCT Filed: Aug. 18, 2021

(86) PCT No.: PCT/JP2021/030183
§ 371 (c)(1),
(2) Date: May 26, 2023

(87) PCT Pub. No.: WO2022/137641
PCT Pub. Date: Jun. 30, 2022

(65) Prior Publication Data
US 2023/0417963 A1 Dec. 28, 2023

(30) Foreign Application Priority Data

Dec. 22, 2020 (JP) ................................. 2020-212816

(51) Int. Cl.
*G02B 5/18* (2006.01)
*B29C 64/124* (2017.01)
(Continued)

(52) U.S. Cl.
CPC .......... *G02B 5/1847* (2013.01); *B29C 64/124* (2017.08); *B29C 64/277* (2017.08);
(Continued)

(58) Field of Classification Search
CPC ...... G02B 5/1847; B33Y 10/00; B33Y 30/00; B33Y 80/00; B29C 64/124; B29C 64/129;
(Continued)

(56) References Cited

U.S. PATENT DOCUMENTS 6,740,474 B2 * 5/2004 Border .................. G03F 7/0005
430/324
2006/0022379 A1 * 2/2006 Wicker .................. B33Y 70/00
264/401
(Continued)

FOREIGN PATENT DOCUMENTS

CN 10-7305260 * 7/2019 .......... G03F 7/2063
JP 2003025453 A 1/2003
(Continued)

OTHER PUBLICATIONS

W. Yang, X. Wang, Z. Wang et al., "Light-powered microrobots: Recent progress and future challenges", Optics and Lasers in Engineering 161 (2023) 107380, accessed at pdf.sciencedirectassets.com on Dec. 4, 2025. (Year: 2023).*
(Continued)

*Primary Examiner* — JaMel M Nelson
(74) *Attorney, Agent, or Firm* — Osha Bergman Watanabe & Burton LLP

(57) ABSTRACT
A method is provided for manufacturing an optical computing device using a container that includes n side walls $WS_1$ to $WS_n$ and n bottom walls $WB_1$ to $WB_n$ made of an optically-transparent material, where n is a natural number of not less than 2. The method includes: forming the container including an i-th cavity $C_i$, using at least an i-th bottom wall $WB_i$ and an i-th side wall $WS_i$, where i is an integer of $1 \le i \le n$; filling the cavity $C_i$ with a liquid material $R_i$ containing a photo-curable resin; and forming a light diffraction element on one main surface of the bottom wall
(Continued)

WB$_i$ through stereolithography by emitting light to a part near an interface between the bottom wall WB$_i$ and the liquid material R$_i$ to cure the photo-curable resin.

10 Claims, 6 Drawing Sheets

(51) Int. Cl.

| | | |
|---|---|---|
| *B29C 64/277* | (2017.01) | |
| *B33Y 10/00* | (2015.01) | |
| *B33Y 80/00* | (2015.01) | |
| *G06E 1/00* | (2006.01) | |
| *B29L 11/00* | (2006.01) | |

(52) U.S. Cl.
CPC .............. *B33Y 10/00* (2014.12); *B33Y 80/00* (2014.12); *G06E 1/00* (2013.01); *B29L 2011/00* (2013.01)

(58) Field of Classification Search
CPC ... B29C 64/135; B29C 64/277; B29C 64/282; B29C 64/171; B29C 64/176; B29L 2011/00; G06E 1/00
See application file for complete search history.

(56) References Cited

U.S. PATENT DOCUMENTS

| | | | |
|---|---|---|---|
| 2015/0309473 A1 | 10/2015 | Spadaccini et al. | |
| 2020/0033571 A1* | 1/2020 | Bertoncini | .......... G02B 17/086 |

FOREIGN PATENT DOCUMENTS

| | | | |
|---|---|---|---|
| JP | 2007026589 A | 2/2007 | |
| JP | 2008194863 A | 8/2008 | |
| JP | 2020524623 A | 8/2020 | |
| WO | 2013027340 A1 | 2/2013 | |
| WO | 20200180254 A1 | 9/2020 | |

OTHER PUBLICATIONS

International Search Report issued in corresponding International Application No. PCT/JP2021/030183, dated Oct. 19, 2021, with translation (5 pages).
Written Opinion issued in corresponding International Application No. PCT/JP2021/030183, dated Oct. 19, 2021, with translation (6 pages).

* cited by examiner

Fig. 2

Manufacturing method M1

112d     112d
113a
         $C_2$                    112b
112a                              111b
         $C_1$
111a
111d     111d

Container forming step S11

113a                             112e
         $C_2 (R_2)$             112b
112a                             111b
         $C_1 (R_1)$
111a                             111e

Liquid material filling step S12

Fig. 3C                  L1
113a                             112e
      $C_2 (R_2)$
112a                             112b
      $C_1 (R_1)$    111c        111b
111a                             111e
                     L1

Stereolithography step S13
(i=1)

Fig. 3D                  L1
113a                             112e
      $C_2 (R_2)$    112c        112b
112a                             111e
      $C_1 (R_1)$
111a          111c               111b
                     L1

Stereolithography step S13
(i=2)

113a                             112e
112            $C_2 (D_2)$  112c  112b
112a
111            $C_1 (D_1)$  111c  111b
111a                             111e

Developing step S14

Fig. 3F                      11
      112f              112f
113a
112            $C_2 (O_2)$  112c  112b
112a
111            $C_1 (O_1)$  111c  111b
111a
      111f              111f

Sealing step S15

Manufacturing method M1A
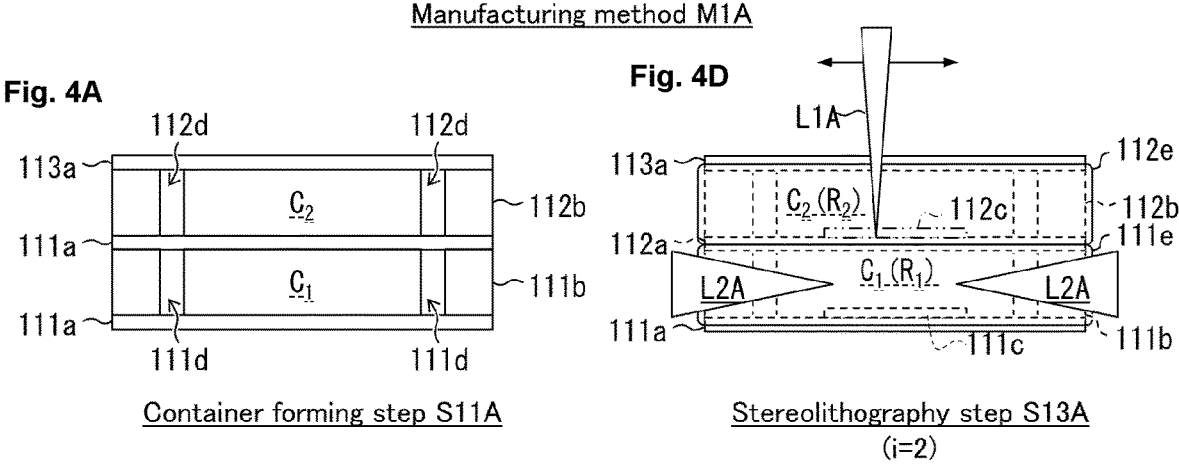
Fig. 4A
Container forming step S11A
Fig. 4D
Stereolithography step S13A
(i=2)
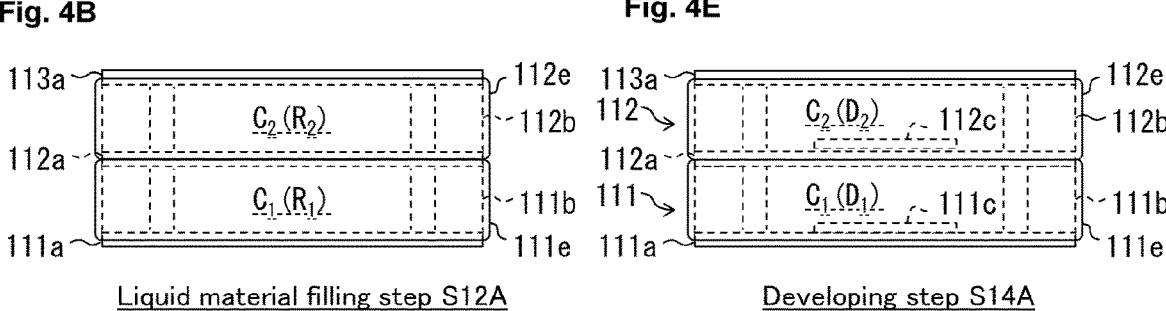
Fig. 4B
Liquid material filling step S12A
Fig. 4E
Developing step S14A
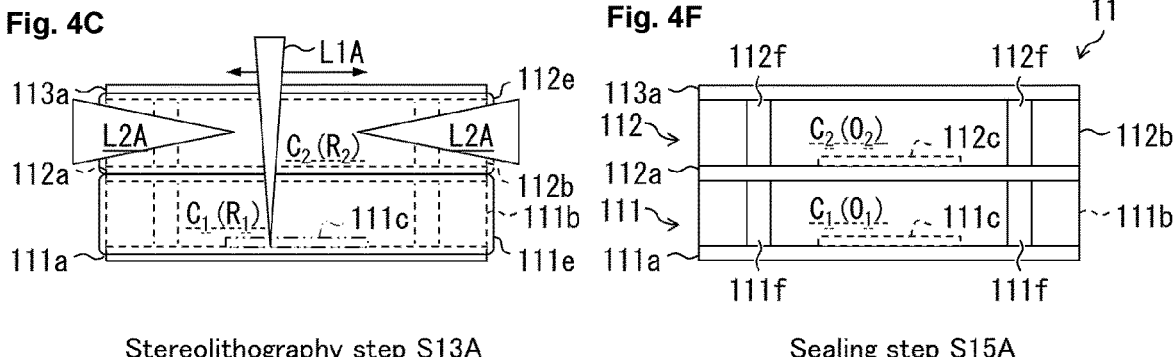
Fig. 4C
Stereolithography step S13A
(i=1)
Fig. 4F
Sealing step S15A Manufacturing method M2

Container forming step S21
(i=1)

Liquid material filling step S22
(i=1)

Stereolithography step S23
(i=1)

Container forming step S21
(i=2)

Liquid material filling step S22
(i=2)

Stereolithography step S23
(i=2)

Developing step S24

Sealing step S25

115

Roughening step S36

114

115

Film forming step S37

Placing step S38

METHOD FOR MANUFACTURING OPTICAL COMPUTATION DEVICE, OPTICAL DIFFRACTION UNIT INTERMEDIATE, AND OPTICAL COMPUTATION DEVICE

TECHNICAL FIELD

The present invention relates to a light diffraction unit intermediate used to manufacture a light diffraction unit including a light diffraction element. The present invention also relates to a method for manufacturing an optical computing device including a plurality of light diffraction units, and to the optical computing device.

BACKGROUND

Patent Literature 1 discloses a technique according to which a plurality of optical elements including lenses and filters are arranged along an optical path of input light so that the plurality of optical elements are caused to act on the input light in sequence. One example of the optical element is a planar light diffraction element that has a fine projection/recess structure and that has a two-dimensional pattern when macroscopically viewed and typically has a thickness of several μm. Hereinafter, the "light diffraction element" refers to a planar light diffraction element. These light diffraction elements are provided on a main surface of a substrate which is optically transparent (such a substrate is read as a "bottom wall" discussed in embodiments described in the present specification). Hereinafter, the light diffraction element and the substrate are referred to as a light diffraction unit.

PATENT LITERATURE 1

International Publication No. WO 2013/027340

In an optical computing device in which a plurality of light diffraction elements are arrayed and the plurality of light diffraction elements are caused to act on input light in sequence, it is important to maintain the light diffraction elements in a desired relative positional relation. This is because, when the light diffraction elements deviate from the desired relative positional relation, the light diffraction elements can hardly exert a desired action on the input light.

As one example of the planar light diffraction element, a light diffraction element is known that includes a plurality of microcells each of which has an individually set thickness or refractive index and that is designed to cause rays of light having passed through the microcells to interfere with each other to execute preset optical computation with a saved space and low power consumption. In an optical computing device including layered light diffraction units each of which includes a substrate and a light diffraction element being configured as above and being provided on the substrate, even a nm-order deviation of the relative positional relation between the light diffraction elements can make it difficult to execute the desired optical computing.

SUMMARY

One or more aspects of the present invention provide an optical computing device in which planar light diffraction elements can be easily maintained in a desired relative positional relation.

A method in accordance with one or more aspects of the present invention for manufacturing an optical computing device is a method for manufacturing an optical computing device with use of a container that includes n (n is a natural number of not less than 2) side walls $WS_1$ to $WS_n$ and n bottom walls $WB_1$ to $WB_n$ made of an optically-transparent material, the method including the steps of: forming a container including an i-th (i is an integer of $1 \leq i \leq n$) cavity $C_i$, with use of at least an i-th bottom wall $WB_i$ and an i-th side wall $WS_i$; filling the cavity $C_i$ with a liquid material $R_i$ containing a photo-curable resin; and carrying out stereolithography by emitting light to a part near an interface between the bottom wall $WB_i$ and the liquid material $R_i$ to cure the photo-curable resin so that a light diffraction element is formed on one main surface of the bottom wall $WB_i$.

A light diffraction unit intermediate in accordance with one or more aspects of the present invention includes: a container having a cavity in its inside, the container including a pair of bottom walls made of an optically-transparent material and a side wall that constitutes the cavity together with the pair of the bottom walls; and a liquid material with which the cavity is filled and which contains a photo-curable resin.

In accordance with one or more embodiments of the present invention, it is possible to provide an optical computing device in which planar light diffraction elements can be easily maintained in a desired relative positional relation.

BRIEF DESCRIPTION OF DRAWINGS

FIG. 2 is a perspective view of one example of a light diffraction element included in the optical computing device shown in FIG. 1A.

FIGS. 3A-3F are views schematically illustrating steps of a method in accordance with Embodiment 1 of the present invention for manufacturing an optical computing device.

FIGS. 4A-4F are views schematically illustrating steps of a variation of the method for manufacturing the optical computing device shown in FIGS. 3A-3F.

DETAILED DESCRIPTION

Configuration of Optical Computing Device

Figure 1:
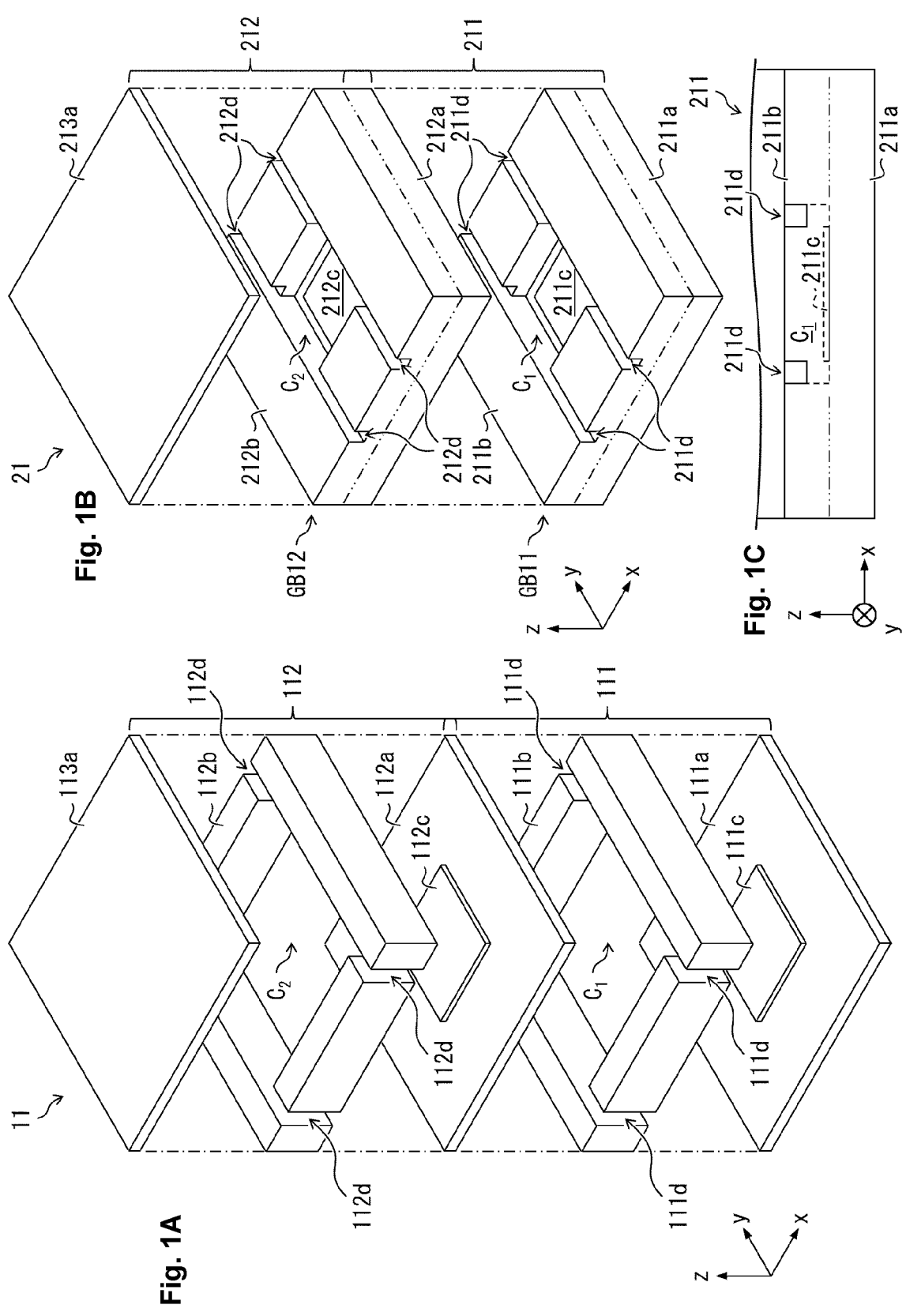
FIGS. 1A and 1B are exploded perspective views of optical computing devices that can be manufactured by a manufacturing method in accordance with one or more embodiments of the present invention.
FIG. 1C is a side view of a part of the optical computing device shown in FIG. 1B.
Figure 2:
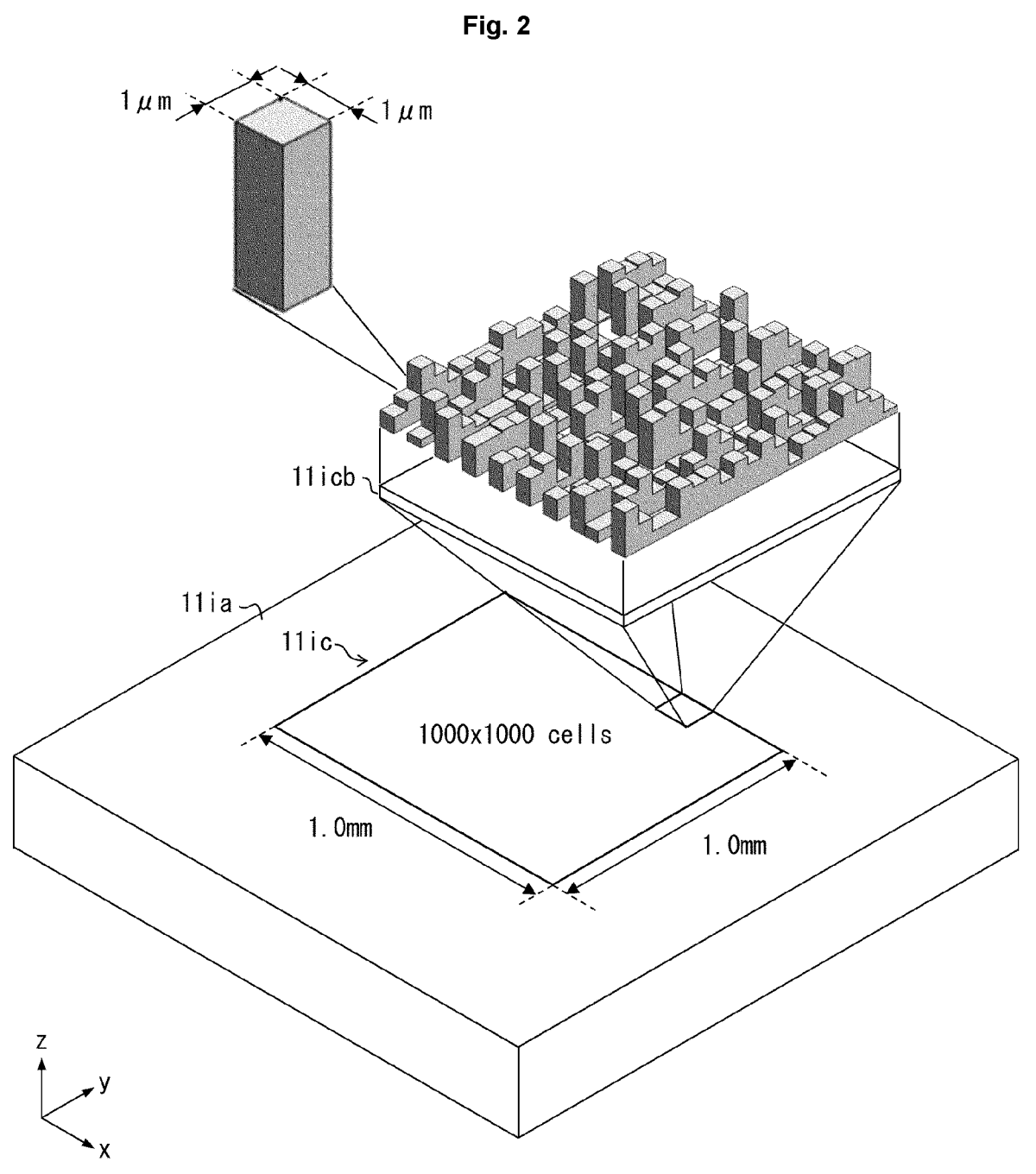

Prior to description of a method for manufacturing an optical computing device in accordance with one or more embodiments of the present invention, the following description will discuss, with reference to FIGS. 1 and 2, optical computing devices 11 and 21, which are examples of an optical computing device that can be manufactured by the method in accordance with one or more embodiments for manufacturing the optical computing device. FIGS. 1A and 1B are exploded perspective views of the optical computing devices 11 and 21, respectively. FIG. 1C is a side view of a light diffraction unit 211 included in the optical computing device 21. FIG. 2 is a perspective view of a light diffraction element 111c included in the optical computing device 11.

Note that the optical computing devices 11 and 21 are embodiments of the present invention.

As shown in FIGS. 1A-1C, the optical computing device 11 includes n (n is an integer of not less than 2) light diffraction units 111, . . . , 11$n$. Similarly, the optical computing device 21 includes n light diffraction units 211, . . . , 21$n$. In one or more embodiments, n=2. However, n is not limited to 2. In a case where the light diffraction units 111 and 112 are not particularly distinguished, each light diffraction unit will be referred to as a light diffraction unit 11$i$ (i is an integer of 1≤i≤n). In a case where the light diffraction units 211 and 212 are not particularly distinguished, each light diffraction unit will be referred to as a light diffraction unit 21$i$.

The optical computing device 11 is constituted by the light diffraction units 111 and 112 layered in this order. The optical computing device 21 is constituted by the light diffraction units 211 and 212 layered in this order. Hereinafter, a direction in which the light diffraction unit 112 is layered on the light diffraction unit 111 and a direction in which the light diffraction unit 212 is layered on the light diffraction unit 211 are each called a layering direction. A direction in parallel with a plane that is orthogonal to the layering direction and with main surfaces of bottom walls 111$a$ to 113$a$ of the light diffraction units 111 and 112 and with main surfaces of bottom walls 211$a$ to 213$a$ of the light diffraction units 211 and 212 is called an in-plane direction.

In FIG. 1A, a direction extending from the light diffraction unit 111 toward the light diffraction unit 112 along the layering direction is defined as a z-axis positive direction. Further, in FIGS. 1A-1C, an orthogonal coordinate system is defined such that the main surfaces of the bottom walls 111$a$ to 113$a$ are in parallel with an xy-plane and an x-axis and a y-axis are in parallel with sides of the light diffraction element 11$ic$. The orthogonal coordinate systems shown in FIGS. 1B-1C and FIG. 2 are defined in a similar manner to the orthogonal coordinate system shown in FIG. 1A.

Note that, in one or more embodiments, the light diffraction unit 111 is identical in configuration to the light diffraction unit 112. In the light diffraction units 211 and 212 of one or more embodiments, a glass block GB11 included in the light diffraction unit 211 is identical in configuration to a glass block GB12 included in the light diffraction unit 212. On the z-axis positive direction side of the glass block GB11, the glass block GB12 is placed for layering. Meanwhile, on the z-axis positive direction side of the glass block GB12, a bottom wall 213$a$ is placed for layering.

<Configuration of Light Diffraction Unit>

As shown in FIG. 1A, each light diffraction unit 11$i$ (i=1, 2) includes a bottom wall 11$ia$, a bottom wall 11($i$+1)a, a side wall 11$ib$, and a light diffraction element 11$ic$.

(Bottom Wall)

Each of the bottom walls 11$ia$ and 11($i$+1)a is a plate-like member which is optically transparent, and the bottom walls 11$ia$ and 11($i$+1)a are identical in configuration to each other. In a case where the optical computing device 11 is arranged to have an orientation shown in FIG. 1A, the bottom wall 11$ia$ constitutes a lower base of the light diffraction unit 11$i$ and the bottom wall 11($i$+1)a constitutes an upper base of the light diffraction unit 11$i$. Note that the bottom walls 11$ia$ and 11($i$+1)a are examples of the bottom walls WB$_i$ and WB$_{i+1}$, respectively.

In one or more embodiments, quartz glass is employed as optically-transparent materials of the bottom walls 11$ia$ and 11($i$+1)a. Note that the optically-transparent material is not limited to the quartz glass, and can be selected as appropriate from among optically-transparent glass and optically-transparent resins.

In one or more embodiments, the light diffraction unit 11$i$ is formed so as to have a square shape when viewed from a direction normal to the main surface (for example, the z-axis positive direction). Hereinafter, seeing the light diffraction unit 11$i$ along a line normal to the main surface is expressed as "seeing the main surface in plan view".

(Side Wall)

The side wall 11$ib$ is interposed between the bottom walls 11$ia$ and 11($i$+1)a, and is constituted by four rectangular parallelepiped blocks disposed along four sides constituting an outer edge of the bottom wall 11$ia$ and four sides constituting an outer edge of the bottom wall 11($i$+1)a. The side wall 11$ib$ surrounds an internal space from four sides, and the bottom walls 11$ia$ and 11($i$+1)a sandwich the internal space from two sides in the layering direction. Consequently, a cavity C$_i$ is formed inside the light diffraction unit 11$i$. The bottom wall 11$ia$, the bottom wall 11($i$+1)a, and the side wall 11$ib$ constitute a container of the light diffraction unit 11$i$. Note that the side wall 11$ib$ is one example of the side wall WS$_i$.

In one or more embodiments, quartz glass is employed as a material of the side wall 11$ib$. Note that the material of the side wall 11$ib$ is not limited to the quartz glass, and can be selected as appropriate from among glass, ceramic, metal, and resin. Note that the material of the side wall 11$ib$ may be a material having a lower linear expansion coefficient than those of metal and resin, and may be glass or ceramic, for example. The quartz glass is one example of the material having such a low linear expansion coefficient. The material of the side wall 11$ib$ may be a material which is optically transparent. With this configuration, it is possible to emit inhibiting light to the cavity C$_i$ from a lateral side of the light diffraction unit 11$i$ as in the methods in accordance with Embodiment 2 for manufacturing an optical computing device (see of FIGS. 4C-4D and FIG. 5F). The inhibiting light refers to light that is emitted to an ultraviolet curable resin so as to inhibit curing of the ultraviolet curable resin. Note that, in a case where an ultraviolet curable resin in an uncured state is cured by a two-photon absorption method as in the manufacturing method M1 shown in FIGS. 3A-3F, the material of the side wall 11$ib$ may not be optically transparent.

Note that, in one or more embodiments, an ultraviolet curable resin (not illustrated in FIG. 1A) is employed as a fixing means for fixing the bottom walls 11$ia$ and 11($i$+1)a to the side wall 11$ib$. However, the fixing means is not limited to the ultraviolet curable resin, and can be selected as appropriate.

(Flow Passage)

As discussed above, the side wall 11$ib$ is constituted by the four rectangular parallelepiped blocks that are arranged so as to be spaced from each other. Thus, the side wall 11$ib$ has four flow passages 11$id$ through which the cavity C$_i$ communicates with the outside of the container constituting the light diffraction unit 11$i$. The shapes and sizes of the flow passages 11$id$ can be set as appropriate.

(Light Diffraction Element)

The light diffraction element 11$ic$ is a planar light diffraction element provided in an effective region on one main surface of the bottom wall 11$ia$ (in one or more embodiments, the main surface on the z-axis positive direction side). The effective region of the bottom wall 11$ia$ refers to a region of the bottom wall 11$ia$ in which region the side wall 11$ib$ does not exist. Similarly to the bottom wall 11$ia$, the light diffraction element 11*ic* is made of a material which is optically transparent. In one or more embodiments, an ultraviolet curable resin, which is one example of a photo-curable resin, is employed as the optically-transparent material of the light diffraction element 11*ic*.

As shown in FIG. 2, the light diffraction element 11*ic* includes a base 11*icb* and a plurality of microcells which are provided in the effective region of the bottom wall 11*ia* and each of which has an individually set thickness or refractive index. In one or more embodiments, the effective region of the bottom wall 11*ia* is in the form of a 1.0 mm square, and is constituted by 1000×1000 microcells arranged in a matrix. Each microcell is constituted by a pillar that is formed on the base 11*icb* and that has a bottom having a 1 μm side. The base 11*icb* is made of an ultraviolet curable resin, which is the same material as that of the microcells. The base 11*icb* has a thickness of 100 μm, for example. However, this is not limitative. In a case where the light diffraction element 11*ic* is formed by stereolithography in the later-described stereolithography step S13, the base 11*icb* can be formed by stereolithography prior to the microcells. Merely for convenience of explanation, FIG. 2 shows an exploded view of the base 11*icb* and the microcells of the light diffraction element 11*ic*. The base 11*icb* and the microcells are formed by stereolithography as the integrated light diffraction element 11*ic* in the later-described stereolithography step S13. Each pillar has a height of, for example, 0 nm, 100 nm, 200 nm, . . . , 1100 nm, or 1200 nm (13 levels in units of 100 nm). The height of the pillar is set so that the microcell constituted by the pillar has a desired refractive index.

In one or more embodiments, the light diffraction element 11*ic* includes the pillars each having a size of 1 μm. However, this is not limitative. That is, the light diffraction element 11*ic* may include the pillars each having a size of less than 10 μm. The number of cells and the effective region size of the light diffraction element 11*ic* may be arbitrarily set.

The optical computing device 11 is designed so as to allow rays of light transmitted through the microcells (mainly, visible light is assumed) to interfere with each other so that predetermined optical computing is executed. In a case where these light diffraction elements 11*ic* are arranged and optical computing is executed N times in sequence, it is important to maintain the light diffraction elements 111*c* and 112*c* in a desired relative positional relation.

Note that the term "microcell" herein refers to, for example, a cell on the order of micrometers or smaller, i.e., a size of less than 10 μm. The term "cell size" herein refers to a square root of an area of a cell. For example, in a case where a microcell has a square shape in plan view, the cell size is a length of one side of the cell. The cell size has a lower limit that is not particularly limited and can be, for example, 1 nm.

<Variations>

An optical computing device 21 is a variation of the optical computing device 11, and a light diffraction unit 21*i* is a variation of the light diffraction unit 11*i*. The description in the present variation will discuss a correspondence relation between the light diffraction units 11*i* and 21*i* and then will discuss only a configuration of a part of the light diffraction unit 21*i* which part is different from a corresponding part of the light diffraction unit 11*i*.

As shown in FIG. 1B, each light diffraction unit 21*i* (i=1, 2) includes a bottom wall 21*ia*, a bottom wall 21(*i*+1)a, a side wall 21*ib*, and a light diffraction element 21*ic*. The bottom wall 21*ia*, the bottom wall 21(*i*+1)a, the side wall 21*ib*, and the light diffraction element 21*ic* of the light diffraction unit 21*i* respectively correspond to the bottom wall 11*ia*, the bottom wall 11(*i*+1)a, the side wall 11*ib*, and the light diffraction element 11*ic* of the light diffraction unit 11*i*. Note that the bottom wall 213*a* and the light diffraction element 21*ic* of the light diffraction unit 21*i* are identical to the bottom wall 113*a* and the light diffraction element 11*ic* of the light diffraction unit 11*i*, respectively. Therefore, descriptions of the bottom wall 213*a* and the light diffraction element 21*ic* are omitted here.

The bottom wall 21*ia* and the side wall 21*ib* of the light diffraction unit 21*i* are formed by processing a glass block GB1*i* made of a piece of glass that is in the form of a rectangular parallelepiped which is square when viewed in plan view. Specifically, in a part of the glass block GB1*i* which part is close to a center of the glass block GB1*i*, a cavity $C_i$ that is in the form of a rectangular parallelepiped is formed so as to extend toward the inside of the glass block GB1*i* from the side of one main surface of the glass block GB1*i* (in one or more embodiments, the main surface on the z-axis positive direction side), whereby the bottom wall 21*ia* and the side wall 21*ib* are formed (see FIGS. 1B and 1C). Note that the bottom walls 21*ia* and 21(*i*+1)a are examples of the bottom walls $WB_i$ and $WB_{i+1}$, respectively. The side wall 21*ib* is an example of the side wall $WS_i$.

In the glass block GB1*i* of one or more embodiments, (1) a planar region which includes the other main surface (i.e., in one or more embodiments, the main surface on the z-axis negative direction side) and in which the cavity $C_i$ is not formed is the bottom wall 21*ia*, and (2) a frame-like region which includes the one main surface and which laterally surrounds the cavity $C_i$ is the side wall 21*ib*. When the main surface of the glass block GB1*i* is seen in plan view from the z-axis positive direction side, a region of the bottom wall 21*ia* which region is not covered with the side wall 21*ib* and which is exposed from the cavity $C_i$ is an effective region of the light diffraction unit 21*i*.

As shown in FIGS. 1B and 1C, the cavity $C_i$ of the light diffraction unit 21*i* is surrounded by the side wall 21*ib* from four sides, and is sandwiched by the bottom wall 21*ia* of the glass block GB1*i* and the bottom wall 21(*i*+1)a of the glass block GB1(*i*+1) from two sides in a layering direction. Thus, the bottom wall 21*ia*, the bottom wall 21(*i*+1)a, and the side wall 21*ib* constitute a container of the light diffraction unit 11*i*. Note that, in the light diffraction unit 21*n* (i=n) from among the light diffraction units 21*i*, the cavity $C_n$ is sandwiched by the bottom wall 21*ia* of the glass block GB1*i* and the bottom wall 213*a* (see FIG. 1B).

In the light diffraction unit 21*i*, the one main surface of the glass block GB1*i* (i.e., a surface on the z-axis positive direction side of the side wall 21*ib*) has flow passages 21*id*, which are four grooves through which the cavity Cr communicates with the outside of the container included in the light diffraction unit 21*i*. The flow passages 21*id* correspond to the flow passages 11*id* of the light diffraction unit 11*i*.

The present variation employs an ultraviolet curable resin (not illustrated in FIG. 1B) as a fixing means for fixing the side wall 21*ib* to the bottom wall 21(*i*+1)a. However, the fixing means is not limited to the ultraviolet curable resin, and can be selected as appropriate.

Embodiment 1

The following description will discuss, with reference to FIGS. 3A-3F, a manufacturing method M1 of an optical computing device in accordance with Embodiment 1 of the present invention. FIGS. 3A-3F are views schematically illustrating steps of the manufacturing method M1. The description in Embodiment 1 will discuss the manufacturing method M1 by discussing, as an example, a case where the optical computing device 11 is manufactured. Note that a device to be manufactured by the manufacturing method M1 is not limited to the optical computing device 11. By the manufacturing method M1, it is possible to manufacture the optical computing device 21, for example.

As shown in FIGS. 3A-3F, the manufacturing method M1 includes a container forming step S11, a liquid material filling step S12, a stereolithography step S13, a developing step S14, and a sealing step S15.

<Container Forming Step>

Figures 3A, 3B, 3E:
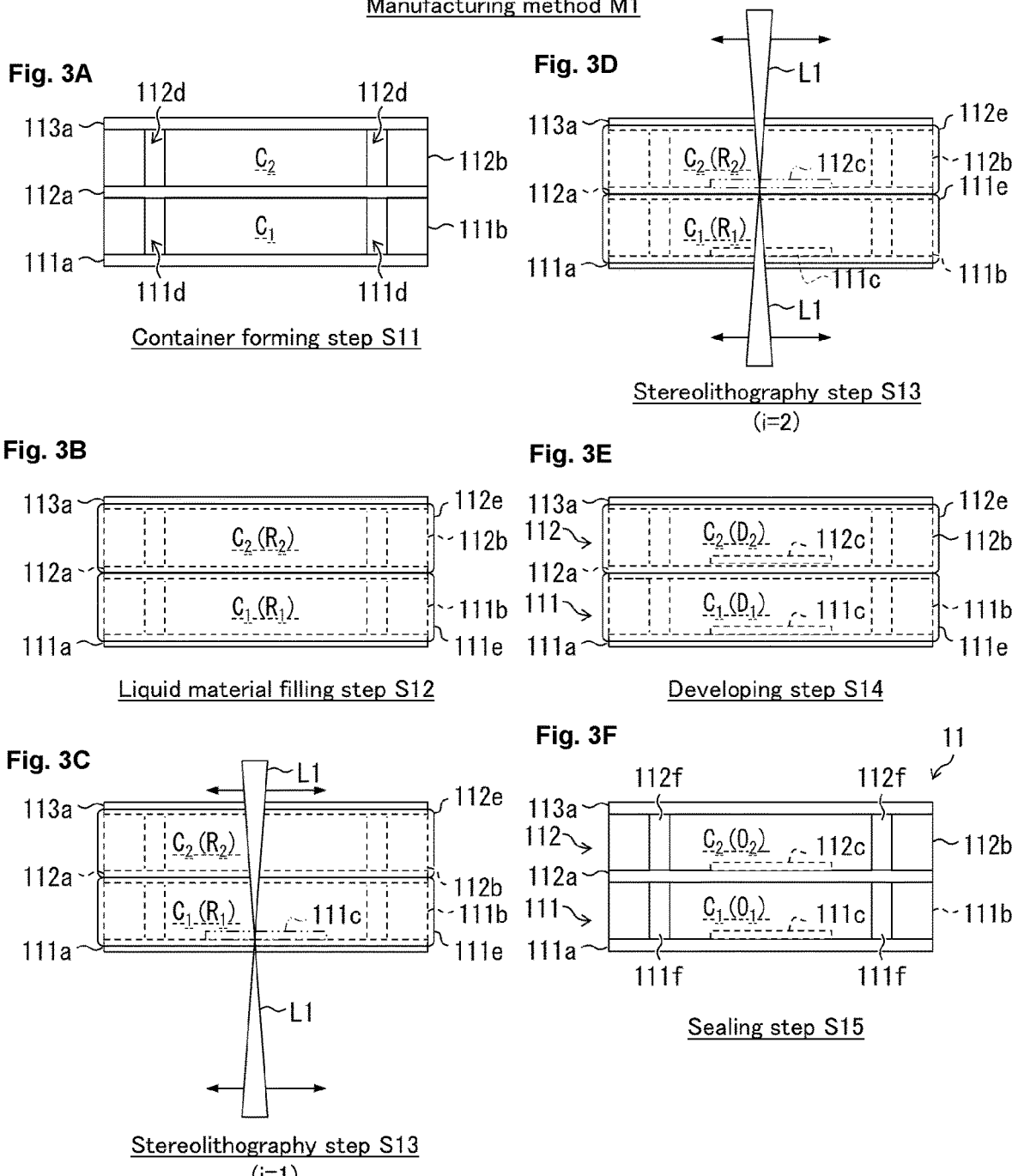

The container forming step S11 is a step of forming a container by layering, in the inside, n (n is a positive integer of not less than 2) cavities $C_i$ (i is an integer of $1 \le i \le n$) (see FIG. 3A). This container is the container of the optical computing device 11 shown in FIG. 1A, and includes n+1 bottom walls 111a to 11(i+1)a made of an optically-transparent material and n side walls 11ib. The description in Embodiment 1 will be described by discussing the optical computing device 11 in which n=2. However, n is not limited 2, and may be set as appropriate. Note that the bottom wall 11ia and the side wall 11ib are examples of the bottom wall $WB_i$ and side wall $WS_i$, respectively.

In Embodiment 1, as shown in FIG. 3A, the bottom wall 111a, the side wall 111b, the bottom wall 112a, the side wall 112b, and the bottom wall 113a are layered, and then adjacent ones of these members are fixed to each other via an ultraviolet curable resin.

In place of the optical computing device 11, the optical computing device 21 may be manufactured in the following manner. That is, etching is carried out on the glass blocks GB1i so as to form the cavities $C_i$ and the flow passages 21id and then the glass blocks GB1i are layered. Consequently, a container having, in its inside, n cavities $C_i$ which are layered can be formed.

<Liquid Material Filling Step>

The liquid material filling step S12 is a step of filling the cavities $C_i$ with a liquid material $R_i$ containing a photo-curable resin (see FIG. 3B). FIG. 3B illustrates an intermediate of the optical computing device in which the cavities $C_i$ are filled with the liquid material $R_i$ and the flow passages 11id are sealed with lids 11ie. In Embodiment 1, the ultraviolet curable resin is employed as the photo-curable resin. The ultraviolet curable resin is an aspect of the photo-curable resin. Emitting an ultraviolet ray to the ultraviolet curable resin promotes a photopolymerization reaction, so that the ultraviolet curable resin is cured. The intermediate of the optical computing device manufactured by carrying out the liquid material filling step S12 is an aspect of the present invention.

Embodiment 1 employs, as the lid 11ie, an annular band made of a silicone resin. The band has a width that is more than a thickness (i.e., a length in the z-axis direction) of the side wall 11ib and less than a thickness of the light diffraction unit 11i. The lid 11ie is not limited to a band made of an elastic resin such as a silicone resin. For example, the lid 11ie may be a columnar plug formed to conform to the shapes of openings of the flow passages 11id. Note that the intermediate of the optical computing device may further include a jig that presses the lid 11ie onto the flow passages 11id.

<Stereolithography Step>

The stereolithography step S13 is a step of carrying out stereolithography by emitting light L1 to a part near an interface between the effective region of the bottom wall 11ia and the liquid material Ri to cure the ultraviolet curable resin so that the light diffraction element 11ic is formed on the one main surface of the bottom wall 11ia (see FIGS. 3C and 3D). In the stereolithography step S13, the light diffraction element 11ic is formed on the one main surface of the bottom wall 11ia in a repeated manner, provided that i satisfies $1 \le i \le n$. FIGS. 3C and 3D illustrate a case where i=1 and a case where i=2, respectively. Thus, the light diffraction element 11ic is formed in each cavity $C_i$ by stereolithography. As shown in FIG. 2, the light diffraction element 11ic is constituted by the base 11icb and the pillars. The stereolithography step S13 forms the base 11icb and the pillars as a single integrated stereolithography product.

In the stereolithography step S13, in the effective region, given regions corresponding to their respective pillars are irradiated with rays of light L1 having given light strengths and given pulse widths given numbers of times, whereby the light diffraction element 11ic (see FIG. 2) is formed.

In the stereolithography step S13, the light L1 is emitted to the part near the interface between the bottom wall 11ia and the liquid material Ri by the two-photon absorption method, so as to cure the ultraviolet curable resin in an uncured state. The light L1 is an example of the light emitted to cure the ultraviolet curable resin. Embodiment 1 employs, as the ultraviolet curable resin, a radical polymerization-type ultraviolet curable resin having an absorption band corresponding to i-line (wavelength: 365 nm) of a mercury lamp. A dose amount for curing the ultraviolet curable resin is not less than 500 mJ/cm² and not more than 1500 mJ/cm².

Embodiment 1 employs, as a laser for emitting the light L1, a mode-locked Ti-sapphire femtosecond laser. This mode-locked Ti-sapphire femtosecond laser emits light L1 having a wavelength of 730 nm (energy: 1.70 eV), a pulse width of 100 femtoseconds, and power of not less than 3 mW and not more than 10 mW. In Embodiment 1, the optical system is set so that a region where a photopolymerization reaction takes place has a diameter of not less than 80 nm and not more than 200 nm. By emitting two rays of such light L1 in two directions toward a single location, a certain region of the ultraviolet curable resin can be irradiated with the light L1 satisfying the dose amount, whereby the ultraviolet curable resin can be cured through a photopolymerization reaction. Note that the two-photon absorption method will be described later.

By emitting the two rays of such light L1 to a single irradiation point in a synchronized manner, a two-photon absorption phenomenon, which is one of non-linear optical effects, takes place in a narrow range in the irradiation point, and accordingly the photopolymerization reaction proceeds therein. Consequently, a portion of the ultraviolet curable resin located in the narrow range can be cured. Meanwhile, in a region outside the narrow range, the two-photon absorption does not take place and therefore the photopolymerization reaction does not proceed therein. Therefore, a portion of the ultraviolet curable resin located outside the narrow range would not be cured. Thus, by employing the two-photon absorption method, it is possible to avoid untended curing of the portion of the ultraviolet curable resin located outside the range corresponding to the light diffraction element 11ic, even if the light L1 is emitted to the effective region of the bottom wall 11ia for each cavity $C_i$ in a repeated manner.

A diameter of the narrow range varies depending on the beam waist diameter and the energy of the light L1, and may be not less than 10 nm and not more than 20 nm, for example. Thus, by employing the two-photon absorption method in the stereolithography step S13, it is possible to further reduce the size of one side of each pillar in the light diffraction element 11*ic*.

Further, by the stereolithography step S13, the base 11*icb* and the microcells of each light diffraction element 11*ic* are formed with use of the same ultraviolet curable resin. This increases the strength of bond between the microcells and the base 11*icb*, as compared to a configuration in which the microcells and the base 11*icb* are made of different materials. For example, in a case where microcells made of an ultraviolet curable resin are formed on a base 11*icb* made of glass, the microcells may be separated from the base 11*icb* at the time of cleaning the uncured photo-curable resin, for example. As compared to this, Embodiment 1 including the microcells and the base 11*icb* made of the same material in an integrated manner involves high strength of bond between the microcells and the base 11*icb*, and thus can provide the effect of making it more difficult for the microcells to be separated from the base 11*icb*.

If the number of microcells separated from the base 11*icb* increases, the property of diffracted light may possibly change, thereby leading to a reduction in accuracy in computing. However, in the light diffraction element 11*ic* manufactured by the stereolithography step S13, the microcells are hardly separated from the base 11*icb*, and therefore such a possibility can be further reduced.

Note that the ultraviolet curable resin employed in the stereolithography step S13 may be an urethane acrylate-based resin, an acrylate-based resin, or the like.

(Two-Photon Absorption Technique)

A two-photon absorption forming method (also simply referred to as a two-photon absorption method) is a method obtained by applying a two-photon absorption phenomenon to stereolithography. The two-photon absorption phenomenon is a characteristic of, among wave nature and particle nature of light, the particle nature, and is a kind of nonlinear optical effect. In a single-photon absorption phenomenon, when the ultraviolet curable resin absorbs a single photon, a transition from a ground state to an excited state takes place. Meanwhile, in the two-photon absorption phenomenon, when the ultraviolet curable resin absorbs two photons at the same time, the transition takes place. The stereolithography is a technique that uses an interaction between resin and light.

The two-photon absorption method has the following three characteristics.

(1) Light having a wavelength within a range that does not cause a reaction in the single-photon absorption can be used as light for curing an ultraviolet curable resin.

(2) A probability that the two-photon absorption phenomenon occurs is proportional to the square of a light intensity of light L1.

(3) A photopolymerization reaction caused by the two-photon absorption phenomenon occurs in a quite small region in a pinpoint manner.

The characteristic (1) means that a typical ultraviolet curable resin which is cured upon irradiation with an ultraviolet ray can be cured with use of light having a wavelength which is approximately twice as high as the wavelength of the ultraviolet ray. For example, it is possible to cure the ultraviolet curable resin with use of an infrared ray.

In relation to the characteristic (2), in the two-photon absorption method, it is effective to use light L1 having a higher light intensity in order to increase the probability that the two-photon absorption phenomenon occurs. For this purpose, it is effective to use, as the light L1, an ultrashort pulse laser beam. This can increase a peak power value of the light L1.

Further, in order to increase the light intensity of the light L1, it is also important to narrow a spot diameter to increase an energy density. By narrowing the spot diameter, the region where the photopolymerization reaction occurs can be limited to a quite small region, as indicated as the characteristic (3).

Note that a space between (i) a lens which is disposed as the last lens in the optical path of the light L1 and which narrows the spot diameter of the light L1 and (ii) a bottom wall adjacent to that lens (in FIG. 3C, the bottom wall 111*a* or 113*a*) may be filled with an optically-transparent liquid material (e.g., oil) having a refractive index adjusted appropriately. With this configuration, it is possible to increase a numerical aperture of the lens.

(Material Used in Two-Photon Absorption Method)

As discussed above, the two-photon absorption method may use light L1 having a wavelength longer than a wavelength region in which the single-photon absorption of the ultraviolet curable resin can occur. Thus, it is possible to use, as the laser for emitting the light L1, a near-infrared-region short-pulse laser (e.g., a femtosecond laser), which is relatively lower in cost than a visible-region short-pulse laser (e.g., a femtosecond laser). The absorption region of the ultraviolet curable resin is outside the infrared region. Therefore, the two-photon absorption method allows the light L1 to enter the inside of the ultraviolet curable resin without being absorbed or scattered by the ultraviolet curable resin so much. Further, since the two-photon absorption phenomenon takes place in a quite small region in a pinpoint manner, the two-photon absorption method can increase a spatial resolution in stereolithography.

In consideration of these characteristics, a commercially-available ultraviolet curable resin can be used as a photo-curable resin used in the two-photon absorption method.

Note that the photo-curable resin used in the two-photon absorption method is not limited to the ultraviolet curable resin. For example, from the viewpoint of the energy at the time when the two-photon absorption phenomenon takes place, there have been developed resins having a molecular structure which is more sensitive to the two-photon absorption phenomenon. Note that the ultraviolet curable resin can be used in the two-photon absorption method, provided that light L1 satisfying the conditions of an energy and a dose amount required for a photopolymerization reaction in a photo-curable resin is used.

Examples of the photo-curable resin encompass a monomer, an oligomer that is an aggregate of monomers, and a photopolymerization initiator. In order to suppress occurrence of an unintended photopolymerization reaction at the time of, e.g., storage, the photo-curable resin may further contain a reaction inhibitor. By selecting the kind of the photopolymerization initiator, it is possible to select an absorption wavelength of the photo-curable resin. Among the photo-curable resins, the ones that absorb an ultraviolet ray are called ultraviolet curable resin. The photo-curable resins are roughly classified into a radical polymerization type and a cation polymerization type, in accordance with a mechanism of a reaction for curing.

In a case of the radical-polymerization-type photo-curable resin, upon absorption of the light L1, the photopolymerization initiator produces radicals, and the radicals act on the monomers so as to cause polymerization in a chain manner. A reaction for termination can occur by the presence of the reaction inhibitor and/or oxygen in the resin. The radicalpolymerization-type photo-curable resin tends to provide a wide variety of selections and a high reaction rate. Examples of the radical-polymerization-type photo-curable resin encompass urethane acrylate-based photo-curable resins, epoxy acrylate-based photo-curable resins, and ester acrylate-based photo-curable resins when classification is made in accordance with the oligomer.

In a case of the cation-polymerization-type photo-curable resin, upon absorption of the light L1, the photopolymerization initiator produces acids, and a cation polymerization of a vinyl monomer, a cyclic ether, or the like is initiated. A reaction for terminating the reaction can occur by a basic substance that is present as an impurity. The cation-polymerization-type photo-curable resin involves the following merits: the cation-polymerization-type photo-curable resin is completely cured in the air; the cation-polymerization-type photo-curable resin is highly stable during storage; and the cation-polymerization-type photo-curable resin hardly shrinks in a stereolithography product. Examples of the cation-polymerization-type photo-curable resin encompass acrylate-based photo-curable resins, epoxy-based photo-curable resins, and vinyl ether-based photo-curable resins when classification is made in accordance with the oligomer.

Note that the photo-curable resin used in the manufacturing method M1 is not limited to the ultraviolet curable resin, and can be selected as appropriate.

<Developing Step>

The developing step S14 is a step of developing the light diffraction elements $11ic$ formed by stereolithography in the stereolithography step S13 (see FIG. 3E). In the developing step S14, the lids 1 lie are removed, and the liquid material $R_i$ which is filled in the cavities $C_i$ and which contains the ultraviolet curable resin is removed. Thereafter, the cavities $C_i$ are filled with a developer $D_i$, the flow passages $11id$ are sealed with the lids 1 lie, and then the light diffraction elements $11ic$ are developed through a given process. Note that the manufacturing method M1 may further include a cleaning step which is to be carried out after the developing step S14 and which cleans the light diffraction elements $11ic$ having been developed.

<Sealing Step>

The sealing step S15 is a step of filling the cavities $C_i$ with oil $O_i$ and sealing the flow passages $11id$. By carrying out the sealing step S15, the optical computing device 11 is completed. In Embodiment 1, the flow passages $11id$ are sealed by pouring an epoxy resin in an uncured state into the flow passages $11id$ and then curing the epoxy resin. However, the sealing means for sealing the flow passages $11id$ is not limited to the epoxy resin.

Carrying out the sealing step S15 (1) can make it difficult for a foreign matter (including moisture) to enter the cavities $C_i$, (2) can suppress vibrations of the light diffraction elements $11ic$, and (3) can suppress deterioration over age (e.g., oxidization) of the light diffraction elements $11ic$. Further, in a case where the oil $O_i$ has a refractive index more than 1 and less than refractive indices of the light diffraction elements $11ic$, carrying out the sealing step S15 (4) can also reduce reflection that can occur at interfaces between the light diffraction elements $11ic$ and the cavities $C_i$.

Note that, in the sealing step S15, in place of the oil $O_i$, a liquid or a solid having a refractive index similar to that of the oil $O_i$ may be used to fill the cavities $C_i$. This can also provide a similar effect to that obtained in a case where the oil $O_i$ is used to fill the cavities $C_i$. Alternatively, in place of the oil $O_i$, a gas such as an oxygen gas or a nitrogen gas may be used to fill the cavities $C_i$. Note that the sealing step S15 may be omitted in a case where the inside of cavities $C_i$ are is filled with the air.

<Variations>

The following description will discuss, with reference to FIGS. 4A-4F, a manufacturing method M1A, which is a variation of the manufacturing method M1. FIGS. 4A-4F are views schematically illustrating steps of the manufacturing method M1A. The description in the present variation will also discuss the manufacturing method M1A by discussing, as an example, a case where the optical computing device 11 is manufactured.

As shown in FIGS. 4A-4F, the manufacturing method M1A includes a container forming step S11A, a liquid material filling step S12A, a stereolithography step S13A, a developing step S14A, and a sealing step S15A. The container forming step S11A, the liquid material filling step S12A, the developing step S14A, and the sealing step S15A are respectively identical to the container forming step S11, the liquid material filling step S12, the developing step S14, and the sealing step S15 included in the manufacturing method M1. Therefore, the description of the present variation will not deal with these steps, and will discuss the stereolithography step S13A.

<Stereolithography Step>

The stereolithography step S13 in the manufacturing method M1 employs the two-photon absorption method in order to prevent unintended curing of the ultraviolet curable resin in a region outside the light diffraction element $11ic$. Meanwhile, the stereolithography step S13A of the present variation employs light L1A and light L2A in order to prevent the unintended curing. The light L1A is one example of light emitted to cure the ultraviolet curable resin, and is also one example of the first light. The light L2A is one example of light emitted to inhibit curing of the ultraviolet curable resin, and is also one example of the second light.

In the stereolithography step S13A, the light L1A is emitted to a part near an interface between an effective region of a bottom wall $11ia$ and a liquid material Ri to cure a ultraviolet curable resin so that a light diffraction element $11ic$ is formed, by stereolithography, on one main surface of the bottom wall $11ia$ (see FIGS. 4C and 4D). In the stereolithography step S13A, the light diffraction element $11ic$ is formed on the one main surface of the bottom wall $11ia$ in a repeated manner, provided that i satisfies $1 \leq i \leq n$. FIGS. 4C and 4D illustrate a case where i=1 and a case where i=2, respectively.

Here, in the stereolithography step S13A, independently of the light L1A, the light L2A is emitted to a cavity which is adjacent to the cavity $C_i$ and which receives the light L1A entering thereto (in a case of FIG. 4C, a cavity $C_2$; in a case of FIG. 4D, the cavity $C_1$). Note that, in one or more aspects of the present invention, the light L2A may be emitted at least to a cavity adjacent to the cavity $C_i$ in which the light diffraction element $11ic$ is formed by stereolithography. For example, in a manufacturing method M1A for manufacturing an optical computing device 11 wherein n=5, in a case where i=3, the light L2A only needs be emitted at least to the cavities $C_2$ and $C_4$; and the light L2A may be emitted to the cavities $C_1$, $C_2$, $C_4$, and $C_5$, which are all the cavities except for the cavity $C_3$.

The present variation employs, as the ultraviolet curable resin, a radical-polymerization-type ultraviolet curable resin having an absorption band corresponding to i-line (wavelength: 365 nm) of a mercury lamp. A dose amount for curing the ultraviolet curable resin is not less than 500 $mJ/cm^2$ and not more than 1500 $mJ/cm^2$. Note that, similarly to the case of the above-described two-photon absorption method, the photo-curable resin used in the present variation is not limited to the ultraviolet curable resin. Further, the present variation can employ an ultraviolet curable resin which is similar to the ultraviolet curable resin discussed in the description of the two-photon absorption method. Note, however, that the ultraviolet curable resin used in the present variation contains, in addition to a photopolymerization initiator, a reaction inhibitor.

The present variation employs continuously oscillating-type semiconductor lasers as lasers for emitting the light L1A and the light L2A, respectively. One of the semiconductor lasers emits the light L1A having a wavelength of 473 nm (energy: 2.62 eV) and power of not less than 3 mW and not more than 10 mW. The other of the lasers emits the light L2A having a wavelength of 375 nm. Each of the light sources for emitting the light L1A and the light L2A is not limited to the laser that emits coherent light, and may alternatively be an LED that emits incoherent light. In the present variation, the optical system is set so that a region where a photopolymerization reaction takes place has a diameter of approximately 1 μm.

Upon reception of the light L1A emitted thereto, the photopolymerization initiator produces radicals. The radicals act on monomers, whereby the photopolymerization reaction is promoted. Meanwhile, upon reception of the light L2A emitted thereto, the reaction inhibitor produces radicals that inhibit the photopolymerization reaction. The radicals act on the monomers and the oligomers, whereby the photopolymerization reaction is inhibited (carbon-carbon bonds formed by the photopolymerization reaction are broken). Thus, by (a) emitting the light L1A to a part near an interface between the effective region of the bottom wall $11ia$ and the liquid material Ri in the cavity $C_i$ in which the light diffraction element $11ic$ is to be formed by stereolithography and (b) emitting the light L2A to a cavity that is not the cavity $C_i$, it is possible to prevent unintended curing of the ultraviolet curable resin in a region outside the light diffraction element $11ic$.

Embodiment 2

The following description will discuss, with reference to FIGS. 5A-5H, a manufacturing method M2 of an optical computing device in accordance with Embodiment 2 of the present invention. FIGS. 5A-5H are views schematically illustrating steps of the manufacturing method M2. The description in Embodiment 2 will also discuss the manufacturing method M2 by discussing, as an example, a case where the optical computing device 11 is manufactured.

Figures 5A, 5B, 5C, 5D, 5E, 5F, 5G, 5H:
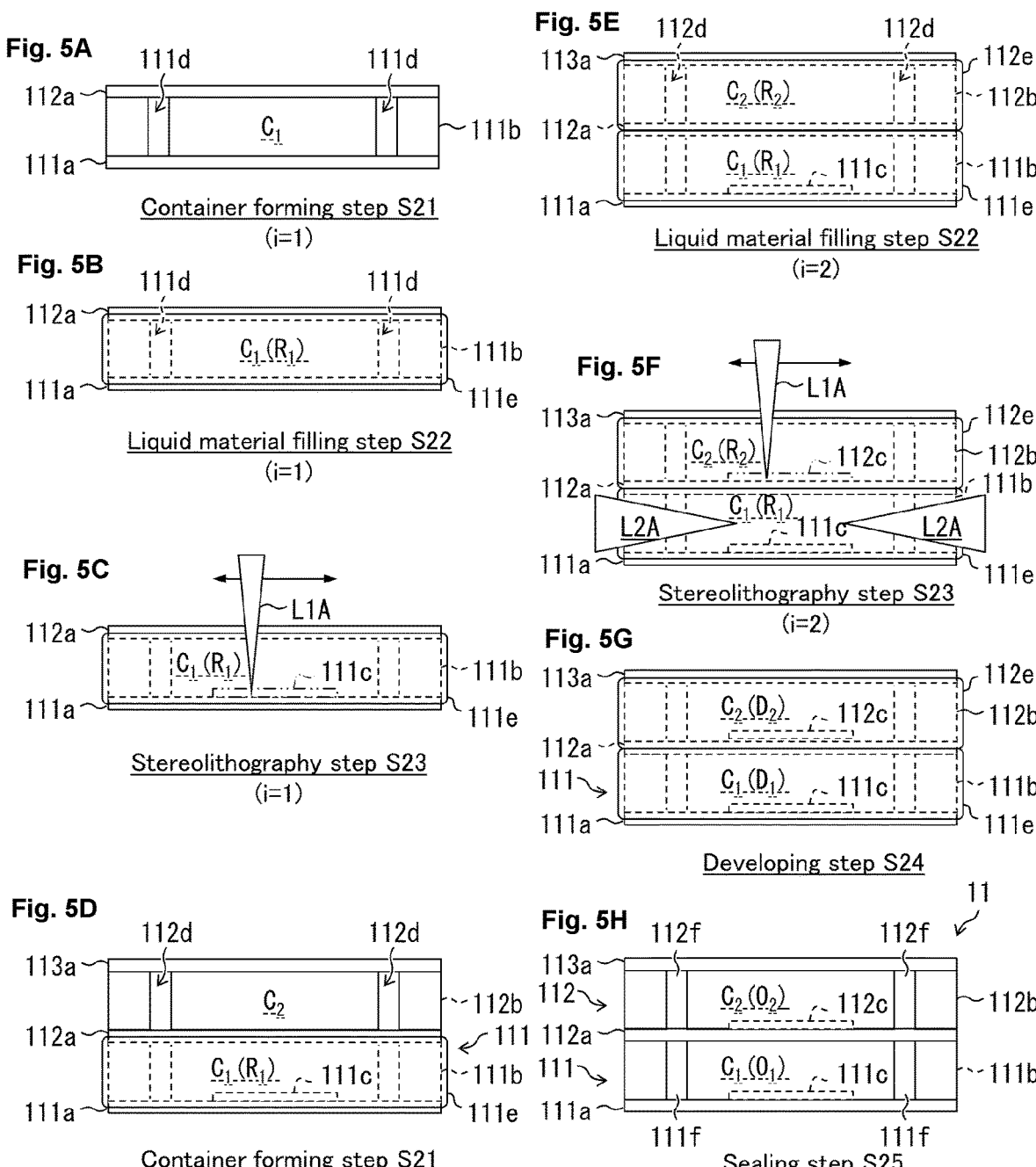
FIGS. 5A-5H are views schematically illustrating steps of a method in accordance with Embodiment 2 of the present invention for manufacturing an optical computing device.

As shown in FIGS. 5A-5H, the manufacturing method M2 includes a container forming step S21, a liquid material filling step S22, a stereolithography step S23, a developing step S24, and a sealing step S25. The developing step S24 and the sealing step S25 are respectively identical to the developing step S14 and the sealing step S15 included in the manufacturing method M1. Therefore, the description of Embodiment 2 will not deal with these steps, and will discuss the container forming step S21, the liquid material filling step S22, and the stereolithography step S23. Note that, in the manufacturing method M2, the container forming step S21, the liquid material filling step S22, and the stereolithography step S23 are carried out, in this order, for each cavity $C_i$ in a repeated manner, provided that i satisfies $1 \le i \le n$. FIGS. 5A-5C are respectively views illustrating the container forming step S21, the liquid material filling step S22, and the stereolithography step S23 when i=1. FIGS.

5D-5F are respectively views illustrating the container forming step S21, the liquid material filling step S22, and the stereolithography step S23 when i=2.

<Container Forming Step>

The container forming step S21 is a step of forming a container including an i-th (i is an integer of $1 \le i \le n$, n is an integer of not less than 2) cavity $C_i$ with use of at least an i-th bottom wall $11ia$ made of an optically-transparent material and an i-th side wall $11ib$. The description in Embodiment 2 will be described by discussing the optical computing device 11 in which n=2. However, n is not limited 2, and may be set as appropriate. Note that the bottom wall $11ia$ and the side wall $11ib$ are examples of the bottom wall $WB_i$ and side wall $WS_i$, respectively.

In Embodiment 2, when i=1, as shown in FIG. 5A, a bottom wall $111a$, a side wall $111b$, and a bottom wall $112a$ are layered, and then adjacent ones of these members are fixed to each other via an ultraviolet curable resin.

In Embodiment 2, when i=2, as shown in FIG. 5D, a side wall $112b$ and a bottom wall $113a$ are layered on the bottom wall $112a$, and then adjacent ones of these members are fixed to each other via the ultraviolet curable resin.

In place of the optical computing device 11, the optical computing device 21 may be manufactured in the following manner. That is, etching is carried out on the glass block GB1i so as to form the cavity $C_i$ and the flow passages 2 lid. Consequently, a container having the cavity $C_i$ in its inside can be obtained.

<Liquid Material Filling Step>

Similarly to the liquid material filling step S12 in the manufacturing method M1, the liquid material filling step S22 is a step of filling the cavities $C_i$ with a liquid material $R_i$ containing a photo-curable resin (in Embodiment 2, an ultraviolet curable resin). In Embodiment 2, each time the container including the cavity $C_i$ is formed, the liquid material filling step S22 of filling the cavity $C_i$ with the liquid material $R_i$ is carried out in a repeated manner (see FIGS. 5B and 5E).

FIG. 5B illustrates an intermediate of the light diffraction unit in which the cavity $C_1$ is filled with the liquid material $R_1$ and the flow passages $111d$ are sealed with a lid $111e$. The intermediate of the light diffraction unit is an aspect of the present invention. A user who has acquired this light diffraction unit can produce an optical computing device 11 including a desired number of light diffraction units which are layered.

<Stereolithography Step>

Similarly to the stereolithography step S13 in the manufacturing method MIA, the stereolithography step S23 of Embodiment 2 employs light L1A and light L2A in order to prevent the above-described unintended curing. The light L1A is one example of light emitted to cure the ultraviolet curable resin, and is also one example of the first light. The light L2A is one example of light emitted to inhibit curing of the ultraviolet curable resin, and is also one example of the second light.

Similarly to the stereolithography step S13A, the stereolithography step S23 is a step of carrying out stereolithography by emitting light L1A to a part near an interface between an effective region of a bottom wall $11ia$ and the liquid material Ri to cure the ultraviolet curable resin so that a light diffraction element $11ic$ is formed on one main surface of the bottom wall $11ia$ (see FIGS. 5C and 5F). FIGS. 5C and 5F illustrate a case where i=1 and a case where i=2, respectively.

Similarly to the stereolithography step S13A, in the stereolithography step S23, independently of the light L1A, the light L2A is emitted to a cavity that is not the cavity $C_i$. Specifically, when i=2, the light L2A is emitted to the cavity $C_1$, as shown in FIG. 5F. However, when i=1, the container does not include any cavity other than the cavity $C_1$, and therefore only the light L1A is emitted to a part near the interface between the effective region of the bottom wall 11ia and the liquid material Ri, as shown in FIG. 5C.

The ultraviolet curable resin, the light L1A, and the light L2A employed in Embodiment 2 are respectively identical to the ultraviolet curable resin, the light L1A, and the light L2A employed in the manufacturing method M1A shown in FIGS. 4A-4F.

Similarly to the stereolithography step S13A, the stereolithography step S23 of Embodiment 2 forms the light diffraction element 11ic by stereolithography with use of the light L1A and the light L2A. Note that, similarly to the stereolithography step S13 shown in FIGS. 3A-3F, the stereolithography step S23 of Embodiment 2 can form the light diffraction element 11ic by the two-photon absorption method.

Variations of Manufacturing Method

Figure 6A:
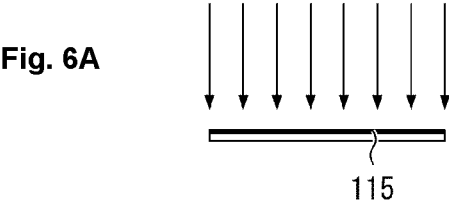
FIGS. 6A-6C are views schematically illustrating steps of another variation of the methods for manufacturing the optical computing device shown in FIGS. 3A-3F and 4A-4F.
Figure 6B:
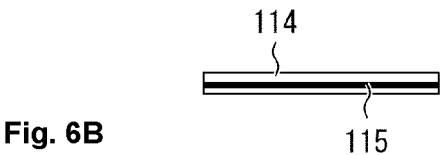
Figure 6C:
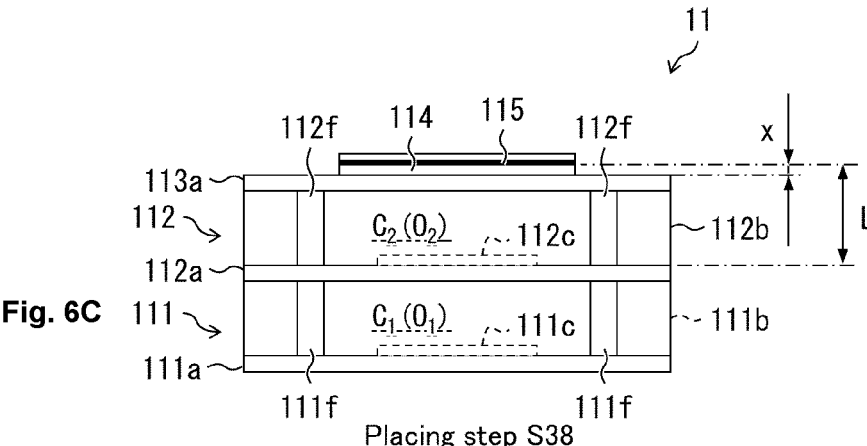

Each of the manufacturing method M1 shown in FIGS. 3A-3F, the manufacturing method M1A shown in FIGS. 4A-4F, and the manufacturing method M2 shown in FIGS. 5A-5H may further include a roughening step S36, a film forming step S37, and a placing step S38 shown in FIGS. 6A-6C. FIGS. 6A-6C are views schematically illustrating the roughening step S36, the film forming step S37, and the placing step S38, respectively. The roughening step S36, the film forming step S37, and the placing step S38 are steps that are to be carried out after any of the sealing steps S15, S15A, and S25.

The roughening step S36 is a step of forming a diffusion layer 115. In the present variation, the diffusion layer 115 is formed by roughening one main surface of a plate-like member made of quartz glass (see FIG. 6A). In the present embodiment, sandblast is used to roughen the one main surface, so that the diffusion layer 115 is obtained. FIGS. 6A-6C show, by thick solid lines, the diffusion layer 115 provided on the one main surface of the plate-like member. Note that the method for roughening the one main surface of the plate-like member made of quartz glass is not limited to the sandblast, and may be a mechanical method other than the sandblast or a chemical method of applying a corrosion liquid.

The film forming step S37 is a step of forming a light conversion layer 114 on a surface of the diffusion layer 115 formed on the plate-like member. There is no limitation on the method for forming the light conversion layer 114. For example, the light conversion layer 114 may be formed by spattering. The material of the light conversion layer 114 will be described later.

The placing step S38 is a step of placing and fixing, onto the effective region of the one main surface of the bottom wall 113a of the optical computing device 11, the plate-like member on which the light conversion layer 114 and the diffusion layer 115 fabricated in the roughening step S36 and the film forming step S37 are formed. The one main surface of the bottom wall 113a is (a) a main surface on the z-axis positive direction side in the orthogonal coordinate system shown in FIGS. 1A-1C and (b) an upper main surface in FIG. 6C. In the present variation, the plate-like member is placed in such an orientation that the light conversion layer 114 is provided at a stage subsequent to the bottom wall 113a and the diffusion layer 115 is provided at a stage subsequent to the light conversion layer 114. Note that there is no limitation on the means for fixing the plate-like member onto the bottom wall 113a. For example, the fixing means may be an ultraviolet curable resin.

By carrying out the roughening step S36, the film forming step S37, and the placing step S38, the light conversion layer 114 and the diffusion layer 115 are provided on the one main surface of the bottom wall 113a of the optical computing device 11. As discussed above, the optical computing device 11 in accordance with one or more aspects of the present invention may further include the light conversion layer 114 and the diffusion layer 115.

Note that the roughening step S36, the film forming step S37, and the placing step S38 are an aspect of the light conversion layer forming step and the diffusion layer forming step. If only the light conversion layer 114 is to be provided at a stage subsequent to the bottom wall 113a, the roughening step S36 may be omitted. That is, in the film forming step S37, the light conversion layer 114 may be formed on a surface of a plate-like member having not been subjected to surface roughening.

<Light Conversion Layer and Diffusion Layer>

Light caused to enter the optical computing device 11 is infrared light (particularly, near infrared light). The reason for using near-infrared light as the incoming light is described first.

The incoming light having entered the optical computing device 11 forms an image on an image plane at a given distance from the last light diffraction element 112c. This distance to the image plane from the last light diffraction element 112c is a numerical value given in multiples of the wavelength of the incident light. Further, the light entering each light diffraction element 11ic needs to be collimated. The distance to the image plane located at a distance in multiples of the wavelength should be as shorter as possible, in consideration of divergence of light with the divergence angle of light. However, a shorter distance to the image plane makes the production including positional alignment difficult. In consideration of the above conditions, light entering the optical computing device 11 should have a longer wavelength as possible. For example, infrared light is more preferable than visible light. This is the reason for using infrared light as the light caused to enter the optical computing device 11.

Each of the light conversion layer 114 and the diffusion layer 115 is a layer-like member provided in a direction substantially orthogonal to a direction in which infrared light enters. In the present variation, each of the light conversion layer 114 and the diffusion layer 115 is in the form of a square when viewed in plan view. There is no particular limitation on the shapes of the light conversion layer 114 and the diffusion layer 115. In the present variation, the shapes of the light conversion layer 114 and the diffusion layer 115 are selected so as to conform to the shape of the light diffraction element 11ic.

The light conversion layer 114 is a layer via which infrared light is converted into visible light (which is called optical upconversion), and is disposed at the last stage in the optical computing device 11. The last stage refers to a stage through which the light having entered the optical computing device 11 exits. In one or more embodiments, the last stage is a stage subsequent to the light diffraction element 112c. The light conversion layer 114 converts, into visible light, the infrared light from the light diffraction element 112c.

The light conversion layer 114 contains, for example, a fluorescent obtained by adding a small amount of erbium (Er), ytterbium (Yb), holmium (Ho), thulium (Tm), or the like to a metal oxide such as a zinc oxide or a titanium oxide.

The light conversion layer 114 contains, for example, a light conversion material containing a metal complex (porphyrin) and a polycyclic aromatic hydrocarbon. The fluorescent or light conversion material emits visible light upon reception of near infrared light emitted thereto.

The optical computing device 11 includes the light conversion layer 114 for the following reason. High-precision cameras that capture infrared light for imaging need to include an imaging device that uses, e.g., an InGaAs sensor, and thus are expensive. Instead of using such cameras, the following alternative method may be possible. That is, infrared light is used as the light caused to transmit through the optical computing device 11, and the infrared light having transmitted through the optical computing device 11 is converted into visible light and is then captured by a visible light camera for imaging. This can be possible because visible light can be captured for imaging by, e.g., an inexpensive CMOS sensor for visible light. The light conversion layer 114 is a light conversion element used to make it possible for a camera for visible light to detect light exiting from the optical computing device 11.

The diffusion layer 115 has a function to diffuse (uniform) visible light generated by the light conversion layer 114. The infrared light entering the light conversion layer 114 is light having transmitted through the microcells, and therefore has a nonuniform intensity. This may cause a reduction in the detection efficiency of the image-capturing element. In order to deal with this, the light is caused to pass through the diffusion layer 115 so that the light is diffused and the light conversion efficiency is enhanced. This can enhance the detection efficiency of the image-capturing element for visible light. There is no limitation on the configuration of the diffusion layer 115, provided that the diffusion layer 115 has a function to diffuse light. Note that deep roughening causes light to diffuse in a depth direction (a travelling direction of the infrared light) and thereby causes an image to be blurred. It is therefore possible to carry out the roughening only on the surface of quartz plate. In other words, the layer having a diffusing function may be thin.

The side wall 112b and the bottom wall 113a define a distance L to the diffusion layer 115 from the last light diffraction element 112c in the optical computing device 11. To be exact, the distance L is a distance to the diffusion layer 115 from the highest position of the microcells of the light diffraction element 112c. However, the heights of the microcells, which are at most approximately 1200 nm (1.2 μm), are negligible. For example, in a case where a thickness of the light conversion layer 114 is x, the sum (the length in the travelling direction of the infrared light) of the heights of the side wall 112b and the bottom wall 113a is assumed to be (L−x). Specifically, in a case where the incoming infrared light is near infrared light having a wavelength of 1550 nm, the distance L can be, for example, 60 μm. In this case, the heights of the side wall 112b and the bottom wall 113a may be set so that the sum of the heights of the side wall 112b and the bottom wall 113a is a value obtained by subtracting, from 60 μm, the thickness x of the light conversion layer 114.

In the above-described optical computing device 11, the light conversion layer 114 is located on the light-entering side, and the diffusion layer 115 is located on the light-exiting side. However, the order of arrangement of the light conversion layer 114 and the diffusion layer 115 is not limited to this, and the light conversion layer 114 and the diffusion layer 115 may be arranged in a reversed order (not illustrated). In this case, the infrared light having exited from the light diffraction element 112c first enters the diffusion layer 115 so as to be diffused, and the infrared light thus diffused enters the light conversion layer 114 so as to be converted into visible light.

Aspects of the present invention can also be expressed as follows:

A method in accordance with a first aspect of the present invention for manufacturing an optical computing device is a method for manufacturing an optical computing device with use of a container that includes n (n is a natural number of not less than 2) side walls $WS_1$ to $WS_n$ and n bottom walls $WB_1$ to $WB_n$ made of an optically-transparent material, the method including the steps of: forming a container including an i-th (i is an integer of $1 \le i \le n$) cavity $C_i$, with use of at least an i-th bottom wall $WB_i$ and an i-th side wall $WS_i$; filling the cavity $C_i$ with a liquid material $R_i$ containing a photo-curable resin; and carrying out stereolithography by emitting light to a part near an interface between the bottom wall $WB_i$ and the liquid material $R_i$ to cure the photo-curable resin so that a light diffraction element is formed on one main surface of the bottom wall $WB_i$.

As compared to a manufacturing method that produces a plurality of light diffraction units in advance, layers the plurality of light diffraction units, and then carries out adjustment so that the light diffraction elements are in a desired relative positional relation, the above configuration can provide an optical computing device in which light diffraction elements can be easily maintained in a desired relative positional relation.

A method in accordance with a second aspect of the present invention for manufacturing an optical computing device employs, in addition to the configuration of the method in accordance with the above-described first aspect for manufacturing the optical computing device, a configuration in which: the step of forming the container, the step of filling of the liquid material, and the step of carrying out the stereolithography are carried out for each cavity $C_i$ in a repeated manner.

The above configuration is employed because the above configuration first forms an i+1-th cavity $C_{i+1}$ and then forms a light diffraction element inside the cavity $C_{i+1}$ in a state where the light diffraction element is already inside the i-th cavity $C_i$, thereby making it possible to form the light diffraction element inside the sp cavity $C_{i+1}$ so that the light diffraction elements are in a desired relative positional relation and eliminating the need for the above-described adjustment.

A method in accordance with a third aspect of the present invention for manufacturing an optical computing device employs, in addition to the configuration of the method in accordance with the above-described first aspect for manufacturing the optical computing device, a configuration in which: the container further includes a bottom wall $WB_{n+1}$, which is an n+1-th bottom wall; in the step of forming the container, the i-th bottom walls $WB_i$, the i+1-th bottom walls $WB_{i+1}$, and the i-th side walls $WS_i$ are used to form the container including i-th cavities $C_i$ which are layered; in the step of filling of the liquid material, the cavities $C_i$ are filled with the liquid material $R_i$ containing the photo-curable resin; and in the step of carrying out the stereolithography, the emission of the light to the part near the interface between the bottom wall $WB_i$ and the liquid material $R_i$ to cure the photo-curable resin so that the light diffraction element is formed on the one main surface of the bottom wall $WB_i$ is carried out for each of the cavities $C_i$.

The above configuration can bring about a similar effect to that of the method in accordance with the above-discussed first aspect for manufacturing the optical computing device.

A method in accordance with a fourth aspect of the present invention for manufacturing an optical computing device employs, in addition to the configuration of the method in accordance with the above-described second or third aspect for manufacturing the optical computing device, a configuration in which: in the step of carrying out the stereolithography, the light is emitted to the part near the interface by a two-photon method.

As compared to a case where the photo-curable resin is cured by emitting single reaction light to the liquid material $R_i$, the above configuration can form a light diffraction element having a more minute structure.

A method in accordance with a fifth aspect of the present invention for manufacturing an optical computing device employs, in addition to the configuration of the method in accordance with the above-described second or third aspect for manufacturing the optical computing device, a configuration in which: the light that is emitted to cure the photo-curable resin is designated as first light and light that is emitted to inhibit curing of the photo-curable resin is designated as second light; and in the step of carrying out the stereolithography, the first light is emitted to the part near the interface and the second light is emitted at least to a cavity adjacent to each of the cavities $C_i$.

In a case where the step of carrying out the stereolithography is carried out in a state where the plurality of cavities $C_i$ are layered, the above configuration can suppress curing of the photo-curable resin which is contained in the liquid material $R_i$ and which is provided in the cavity that is not the cavity $C_i$.

A method in accordance with a sixth aspect of the present invention for manufacturing an optical computing device employs, in addition to the configuration of the method in accordance with any of the above-described first to fifth aspects for manufacturing the optical computing device, a configuration in which: the light diffraction element includes a plurality of cells having respective thicknesses or refractive indices set independently of each other.

Examples of the light diffraction element included in the optical computing device include a light diffraction element including a plurality of cells having respective thicknesses or refractive indices set independently of each other.

A method in accordance with a seventh aspect of the present invention for manufacturing an optical computing device employs, in addition to the configuration of the method in accordance with any of the above-described first to sixth aspects for manufacturing the optical computing device, a configuration in which: the method further includes the step of forming a light conversion layer at a stage subsequent to a last bottom wall, the light conversion layer being configured to convert infrared light into visible light.

In a case where infrared light is used as the incoming light, the above configuration can provide an optical computing device that can convert, into visible light, the light emitted from the optical computing device and detect the exit light with use of an image-capturing element for visible light.

A method in accordance with an eighth aspect of the present invention for manufacturing an optical computing device employs, in addition to the configuration of the method in accordance with the above-described seventh aspect for manufacturing the optical computing device, a configuration in which: the method further includes the step of forming a diffusion layer at the stage subsequent to the last bottom wall, the diffusion layer being configured to diffuse the infrared light or the visible light.

The above configuration can enhance the light conversion efficiency in the light conversion layer.

A light diffraction unit intermediate in accordance with a ninth aspect of the present invention includes: a container having a cavity in its inside, the container including a pair of bottom walls made of an optically-transparent material and a side wall that constitutes the cavity together with the pair of the bottom walls; and a liquid material with which the cavity is filled and which contains a photo-curable resin.

With use of a plurality of light diffraction unit intermediates configured as above, a user can carry out any of the methods in accordance with the above-described first to sixth aspects for manufacturing the optical computing device, so as to manufacture an optical computing device in which light diffraction elements can be easily maintained in a desired relative positional relation.

A light diffraction unit intermediate in accordance with a tenth aspect of the present invention employs, in addition to the configuration of the light diffraction unit intermediate in accordance with the above-described ninth aspect, a configuration in which: the container has a flow passage through which the cavity communicates with an outside of the container; and the light diffraction unit intermediate further includes a lid with which the flow passage is sealed.

With the above configuration, it is possible to easily remove the liquid material with which the cavity is filled and which contains the photo-curable resin so that the liquid material is discharged to the outside of the cavity. Further, with the above configuration, the liquid material containing the photo-curable resin can be easily replaced with another liquid material (e.g., a developer or oil). Thus, it is possible to easily carry out development of the light diffraction element, cleaning, filling of oil, and/or the like. Note that, by adjusting the refractive index of the oil as appropriate, it is possible to adjust the refractive index difference that may occur at an interface between the light diffraction element and the cavity and an interface between the cavity and the bottom wall.

A light diffraction unit intermediate in accordance with an eleventh aspect of the present invention employs, in addition to the configuration of the light diffraction unit intermediate in accordance with the above-described ninth or tenth aspect, a configuration in which: the side wall is made of an optically-transparent material.

With the above configuration, since the side wall is made of the optically-transparent material, it is possible to emit light from the outside of the side wall toward the cavity provided inward of the side wall. Thus, the light diffraction unit intermediate in accordance with the eleventh aspect can be suitably used to carry out the method in accordance with the above-described fifth aspect for manufacturing the optical computing device. The optically-transparent material may be glass, for example. The glass is low in linear expansion coefficient than other materials such as metal and resin. Thus, employing the glass as the optically-transparent material makes it easier to maintain a constant interval between adjacent ones of the light diffraction elements.

An optical computing device in accordance with a twelfth aspect of the present invention includes: n (n is a natural number of not less than 2) side walls $WS_1$ to $WS_n$; n+1 bottom walls $WB_1$ to $WB_{n+1}$ made of an optically-transparent material, the n+1 bottom walls $WB_1$ to $WB_{n+1}$ being configured such that each i-th cavity $C_i$ (i is a natural number of not less than 1 and not more than n) is formed by sandwiching a side wall $WS_i$ between a bottom wall $WB_i$ and a bottom wall $WB_{i+1}$; and a light diffraction element $OD_i$ formed on one main surface of the bottom wall $WB_i$, the light diffraction element $OD_i$ including a plurality of cells having respective thicknesses or refractive indices set independently of each other.

With use of the optical computing device configured as above, a user can manufacture an optical computing device in which light diffraction elements can be easily maintained in a desired relative positional relation.

An optical computing device in accordance with a thirteenth aspect of the present invention employs, in addition to the configuration of the optical computing device in accordance with the above-described twelfth aspect, a configuration in which: the side walls $WS_i$ are made of an optically-transparent material.

With the above configuration, since the side wall is made of the optically-transparent material, it is possible to emit light from the outside of the side wall toward the cavity provided inward of the side wall. Thus, the light diffraction unit intermediate in accordance with the thirteenth aspect can be suitably used to carry out the method in accordance with the above-described fifth aspect for manufacturing the optical computing device. The optically-transparent material may be, for example, glass. The glass is low in linear expansion coefficient than other materials such as metal and resin. Thus, employing the glass as the optically-transparent material makes it easier to maintain a constant interval between adjacent ones of the light diffraction elements.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

11, 21: optical computing device
111, 112, 211, 212: light diffraction unit
111a, 112a, 113a, 211a, 212a, 213a: bottom wall (bottom wall $WB_i$)
111b, 112b, 211b, 212b: side wall (side wall $WS_i$)
111c, 112c, 211c, 212c: light diffraction element
$C_1$, $C_2$: cavity (cavity $C_i$)
The invention claimed is:

1. A method for manufacturing an optical computing device using a container that includes n side walls $WS_1$ to $WS_n$ and n bottom walls $WB_1$ to $WB_n$ made of an optically-transparent material, where n is a natural number of not less than 2, the method comprising the steps of:
   forming the container including an i-th cavity $C_i$ and a flow passage through which the i-th cavity $C_i$ communicates with an outside of the container, using at least an i-th bottom wall $WB_i$ and an i-th side wall $WS_i$, where i is an integer of $1 \leq i \leq n$;
   filling the i-th cavity $C_i$ with a liquid material $R_i$ containing a photo-curable resin and sealing the flow passage using a lid;
   forming n light diffraction elements of the optical computing device on one main surface of the bottom wall $WB_i$ through stereolithography by emitting light to a part near an interface between the bottom wall $WB_i$ and the liquid material $R_i$ to cure the photo-curable resin, and
   removing the lid and removing the liquid $R_i$ from the i-th cavity C through the flow passage.

2. The method as set forth in claim 1, wherein:
   the forming of the container, the filling the cavity $C_i$, and the forming of the light diffraction elements are carried out repeatedly for each cavity $C_i$.

3. The method as set forth in claim 1, wherein:
   the container further includes a bottom wall $WB_{n+1}$, which is an n+1-th bottom wall;
   in the forming of the container, the i-th bottom walls $WB_i$, i+1-th bottom walls $WB_{i+1}$, and the i-th side walls $WS_i$ are used to form the container, and the cavities $C_i$ are layered;
   in the filling the cavity $C_i$, the cavities $C_i$ are filled with the liquid material $R_i$ containing the photo-curable resin; and
   in the forming of the light diffraction elements, the emitting of the light is carried out for each of the cavities $C_i$.

4. The method as set forth in claim 2, wherein:
   in the forming of the light diffraction elements, the light is emitted to the part near the interface by a two-photon method.

5. The method as set forth in claim 2, wherein:
   a second light is emitted to inhibit curing of the photo-curable resin; and
   in the forming of the light diffraction elements, the second light is emitted at least to a cavity adjacent to each of the cavities $C_i$.

6. The method as set forth in claim 1, wherein:
   each of the light diffraction elements includes a plurality of cells having respective thicknesses or refractive indices set independently of each other.

7. The method as set forth in claim 1, further comprising the step of:
   forming a light conversion layer at a stage subsequent to a last bottom wall, the light conversion layer being configured to convert infrared light into visible light.

8. The method as set forth in claim 7, further comprising the step of:
   forming a diffusion layer at the stage subsequent to the last bottom wall, the diffusion layer being configured to diffuse the infrared light or the visible light.

9. The method as set forth in claim 1, wherein:
   the side wall $WS_i$ is constituted by four blocks each having a rectangular parallelepiped shape; and
   the flow passage is formed by arranging the four blocks of the side wall $WS_i$ such that the four blocks are spaced from each other.

10. The method as set forth in claim 1, wherein:
   the flow passage is a groove provided to the side wall $WS_i$.

* * * * *